No. 12,250. REISSUED JULY 26, 1904.

J. BERRY.

AIR SHIP.

APPLICATION FILED OCT. 6, 1903.

2 SHEETS—SHEET 1.

Witnesses

W. A. Alexander

R. C. Betzeman

Inventor

John Berry

By Attorneys Fowler & Brysson.

No. 12,250. REISSUED JULY 26, 1904.

J. BERRY.

AIR SHIP.

APPLICATION FILED OCT. 6, 1903.

2 SHEETS—SHEET 2.

Witnesses

W. A. Alexander

D. C. Betjeman

Inventor

John Berry

By Attorneys Fowler & Bryson.

No. 12,250. Reissued July 26, 1904.

UNITED STATES PATENT OFFICE.

JOHN BERRY, OF ST. LOUIS COUNTY, MISSOURI, ASSIGNOR TO BERRY AERIAL NAVIGATION COMPANY, A CORPORATION.

AIR-SHIP.

SPECIFICATION forming part of Reissued Letters Patent No. 12,250, dated July 26, 1904.

Original No. 723,636, dated March 24, 1903. Application for reissue filed October 6, 1903. Serial No. 176,014.

*To all whom it may concern:*

Be it known that I, JOHN BERRY, of the county of St. Louis, State of Missouri, have invented new and useful Improvements in Air-Ships, of which the following is a full, clear, and exact description, reference being had to the accompanying drawings, forming a part hereof.

My invention relates to air-ships; and it consists of the novel construction, combination, and arrangement of parts hereinafter shown, described, and claimed.

The object of my invention is to provide an improved dirigible air-ship of the balloon type.

Figure 1:
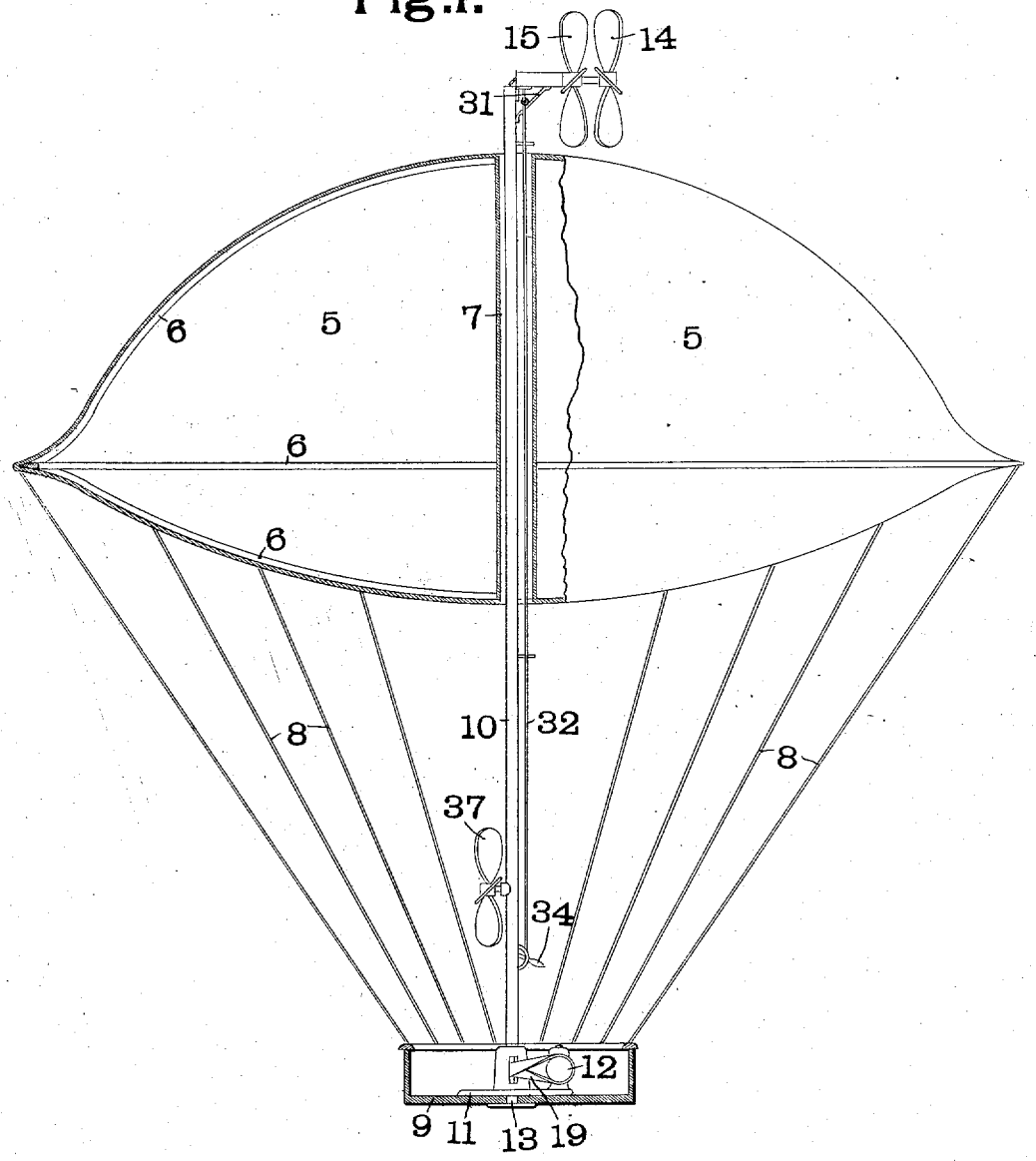
Figure 2:
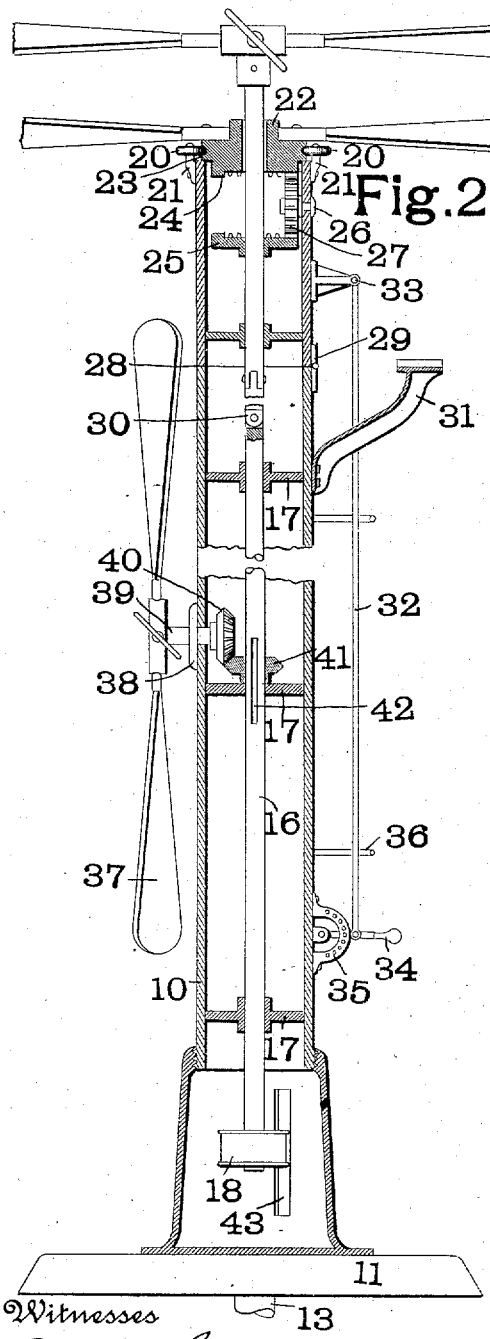
Figure 3:
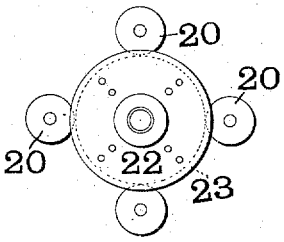
Figure 4:
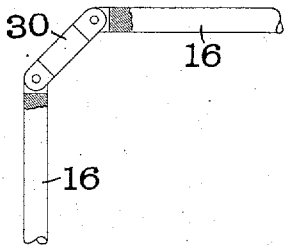

In the drawings, Figure 1 is a sectional side elevation of an air-ship embodying my invention. Fig. 2 is a detail sectional side elevation of the hollow mast which extends from the basket to the top of the balloon and the same having driving mechanism and propellers attached thereto. Fig. 3 is a detail plan view of the upper end of the said hollow mast with the propellers detached. Fig. 4 is a detail showing the universal joint for driving the upper propellers.

5 indicates a balloon made of the usual material, but preferably circular in plan. The greatest diameter of the balloon is greater than the height of the balloon and is arranged at a point below the center of the height, so as to divide the balloon into two curved parts, of which the upper is the largest, as is clearly shown in Fig. 1 of the drawings. The balloon is stretched on a frame 6, composed of the usual materials, for the purpose of holding the balloon in shape and to retain the parts in proper position. Passing centrally through the balloon is a vertical tube or hose 7. The balloon should of course be provided with the customary gas induction and eduction devices. (Not shown.)

Suspended from the balloon by means of the ropes or wires 8 is the basket 9. Mounted centrally of the floor of the basket 9 is a tubular mast 10, which is provided with a revoluble base 11, upon which is mounted a suitable motor 12, which is preferably made mainly of aluminium. The base 11 has a journal 13, which extends through the floor of the basket and is provided beneath the basket with a flange or other suitable device which retains the said mast in position, but at the same time allows it to be revolved.

14 and 15 indicate two propellers which are located at the upper end of the said mast, said propeller 14 being mounted on the upper end of the shaft 16, which extends downwardly through suitable bearings 17 in the said mast and is provided at its lower end with a pulley 18, around which passes a belt 19, connected to said motor 12. It is obvious, however, that this belt and pulley may be replaced by means of sprocket-wheels and chain or common gear-wheels without departing from my invention. The propellers 14 and 15 are both designed to simultaneously propel the air-ship in the same direction; but they are arranged to revolve in opposite directions. It will be observed that the blades of the two propellers are therefore reversely set. The reverse motion is brought about by means of the following-described mechanism: The propeller 15 revolves loosely about the said shaft 16 and is supported by means of a series of small rollers 20, which are mounted upon the brackets 21 at the upper end of the said mast 10, and the propeller-hub 22 is provided with a peripheral groove 23, in which said rollers run. The under side of said hub 22 is provided with gear-teeth 24. Fixed upon the shaft 16 a slight distance below the said hub 22 is a gear-wheel 25, and mounted upon a stud 26 is a pinion 27, the teeth of which simultaneously engage the teeth of the said gear-wheel 25 and also those of said hub 22, so that when the said shaft 16 is revolved the upper propeller 14 will move in the same direction, but the lower propeller will move in an opposite direction. The upper section of the mast 10 is separated at 28 from the main body of said mast and provided with a hinge 29 at the joint, so that the propellers may be arranged at different angles relative to the air-ship. The shaft 16 is provided with a common universal joint 30 at a point just below the joint in the said mast.

31 indicates a suitable bracket, secured to the exterior of the mast so that its upper end projects in horizontal alinement with the joint in the mast. 32 indicates an operating-rod, which is secured at 33 to the hinged section of the said mast and extends downwardly to a point convenient for the operator and is provided with a hand-lever 34 and with a common perforated sector 35, by means of which said lever may be fixed in any desired position. 36 36 indicate guides on the said mast within which said rod operates.

The two propellers just described may be used both for elevating and depressing the air-ship and for propelling the same in a horizontal direction.

I also provide what I term a "traveling" propeller 37, which is mainly for use when the air-ship is traveling in a horizontal plane, which is mounted vertically in a suitable bearing upon the side of the mast 10 just a short distance above the basket 9. Upon the inner end of the traveling-propeller shaft 39 is a bevel gear-wheel 40, which meshes with another bevel gear-wheel, 41, which is splined upon the shaft 16 by means of a feather 42, so that when the said shaft moves up and down during operation of changing the angle of the upper propeller it will still drive the said bevel gear-wheel 41. Slots or openings, such as 43, are cut in the lower portion of the said mast 10 for the passage of the belt 19.

The operation is as follows: The balloon 5 is to be fully inflated in the usual manner, and in making the ascent the upper propellers 14 and 15 are placed in the position in which they are shown in Fig. 2, so that they may assist in lifting the air-ship. The buoyancy of the balloon is only sufficient to counterbalance the weight of the air-ship, and therefore the swifter the said propellers 14 and 15 are revolved the faster the air-ship will rise. The motor 12 should of course be reversible in any usual manner, so that all the propellers may be quickly reversed, if so desired. After the ship has reached the desired height then the said propellers 14 and 15 may be turned at any angle between a horizontal and a vertical line, such as that in which they are shown in Fig. 1. This is done by manipulating the hand-lever 34. By pulling said hand-lever downwardly the rod 32 will cause the upper hinged section of the mast 10 and the shafts 16, carrying the upper propellers 14 and 15, to be moved laterally upon their pivot-points, the said hinged section of the mast moving upon its hinge 29 and the said hinged section of the shaft 16 moving upon its universal joint, so that the movement of the said propellers will not be interfered with in changing the plane in which they may be revolving. By throwing the propellers into the position in which they are shown in Fig. 1—that is, so that they will revolve in a vertical plane—they will then assist the traveling propeller 37 in propelling the ship in a horizontal direction. When the hinged section of the mast 10 occupies a horizontal position, it will rest upon the bracket 31, so that a prolonged trip in a horizontal direction may be made without the operator being compelled to support the weight of the upper propellers and their connections.

When it is desired to change the horizontal direction in which the air-ship is traveling, the operator stands upon the bottom of the basket 9 and grasps some portion of the mast 10 or the motor 12 and turns the said mast with relation to the said basket, thereby changing the position of the traveling propeller 37 and causing the air-ship to be propelled in a different direction.

From the above description it will be seen that I have provided an improved air-ship which is very simple and reliable in its construction and operation and which may therefore be built at a comparatively low cost.

What I claim is—

1. In an air-ship, the combination with a balloon having a vertical axis of symmetry, of a propeller arranged above said balloon and having its axis at an angle to the axis of said balloon and rotatable around the said axis of the balloon to change the direction of the ship.

2. In an air-ship, the combination with a balloon substantially circular in plan, of a propeller arranged above said balloon and having its axis at an angle to the vertical axis of said balloon and rotatable around the said axis of the balloon to change the direction of the ship.

3. In an air-ship, the combination with a balloon having a vertical axis of symmetry, of a propeller above said balloon, and a second propeller below said balloon, both of said propellers having their axes at an angle to the axis of said balloon and both being rotatable around the axis of said balloon to change the direction of the ship.

4. In an air-ship, the combination with a balloon, of a pair of propellers having their blades turned in opposite direction and arranged on a common vertical axis, means for swinging said propellers from a vertical to a horizontal position and means for simultaneously rotating said propellers in opposite directions in either of said positions.

5. In an air-ship, the combination with a balloon, of a basket or car below said balloon, a shaft extending through said balloon, a propeller on the upper end of said shaft, connections within control of the occupant of the car for swinging the said propeller in a vertical plane, and driving mechanism for said propeller.

6. In an air-ship, the combination with a balloon, of a basket or car below said balloon, a propeller above said balloon, connections within control of the occupant of said car for swinging said propeller in a vertical plane, locking device for retaining the propeller in the desired position and driving mechanism for said propeller.

7. In an air-ship, the combination with a balloon of a basket or car below said balloon, a mast projecting through said balloon, said mast being formed of an upper and lower part hinged together, a propeller carried by the upper part of said mast, connections within control of the occupant of the car for moving the upper part of said mast, and a bracket carried by the lower part of said mast for supporting the upper part in a horizontal position.

8. An air-ship having a balloon, circular in plan and composed of two curved sections united at their marginal edges; a suitable interior frame for retaining the balloon in shape; a vertical tube or hose passing centrally through the balloon; a basket suspended from the balloon; a hollow mast extending upwardly from the basket through the vertical tube, there being a joint in said mast above the balloon, allowing the upper end of the mast to swing from a vertical to a horizontal line; means of operating and controlling said joint; a propeller at the upper end of said mast; a propeller-shaft extending from the propeller downwardly through said mast, and having a joint to correspond with the joint in the mast; and means of driving said propeller-shaft, substantially as specified.

9. An air-ship having a balloon; a vertical tube or hose passing centrally through the balloon; a basket suspended from the balloon; a hollow mast extending upwardly from the basket through the balloon, there being a joint in said mast above the balloon; a propeller mounted at the upper end of the mast; means of operating said joint to swing the propeller from a vertical to a horizontal line; means of adjusting the propeller to any desired angle between a vertical and a horizontal line; and means of driving the propeller, substantially as specified.

10. An air-ship having a balloon, circular in plan and composed of two curved sections united at their marginal edges; a suitable interior frame for retaining the balloon in shape; a vertical tube or hose passing centrally through the balloon; a basket suspended from the balloon; a hollow mast extending upwardly from the basket through the vertical tube, there being a joint in said mast, above the balloon, allowing the upper end of the mast to swing from a vertical to a horizontal line; means of operating and controlling said joint; propellers at the upper end of said mast; the blades of one propeller being set the reverse of the blades of the other propeller; a connection between the propellers whereby they move in opposite directions; a propeller-shaft extending from the propellers downwardly through said mast and having a joint to correspond with the joint in the mast; and means of driving said propeller-shaft, substantially as specified.

11. An air-ship having a balloon; a vertical tube or hose passing centrally through the balloon; a basket suspended from the balloon; a hollow mast extending upwardly from the basket through the balloon, there being a joint in said mast above the balloon; propellers at the upper end of said mast; the blades of one propeller being set the reverse of the blades of the other propeller; a connection between the propellers whereby they move in opposite directions; means of operating said joint to swing the propellers from a vertical to a horizontal line; means of adjusting the propellers to any desired angle between a vertical and a horizontal line; and means of driving the propellers, substantially as specified.

12. An air-ship having a balloon; a vertical tube or hose passing centrally through the balloon; a basket suspended from the balloon; a hollow mast extending upwardly from the basket through the balloon, there being a joint in said mast above the balloon; propellers at the upper end of said mast; the blades of one propeller being set the reverse of the blades of the other propeller; a connection between the propellers whereby they move in opposite directions; means of operating said joint to swing the propellers from a vertical to a horizontal line; means of adjusting the propellers to any desired angle between a vertical and a horizontal line; means of driving the propellers; and a third propeller mounted upon the mast below the balloon and connected to the propeller-shaft, substantially as specified.

In testimony whereof I have hereunto set my hand and affixed my seal in the presence of the two subscribing witnesses.

JOHN BERRY. [L. S.]

Witnesses:
W. A. ALEXANDER,
JAMES H. BRYSON.